US006957260B1

(12) United States Patent
Mighdoll et al.

(10) Patent No.: US 6,957,260 B1
(45) Date of Patent: *Oct. 18, 2005

(54) METHOD OF IMPROVING ACCESS TO SERVICES PROVIDED BY A PLURALITY OF REMOTE SERVICE PROVIDERS

(75) Inventors: Lee S. Mighdoll, San Francisco, CA (US); Bruce A. Leak, Portola Valley, CA (US); Stephen G. Perlman, Mountain View, CA (US); Phillip Y. Goldman, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 238 days.

This patent is subject to a terminal disclaimer.

(21) Appl. No.: 10/037,869

(22) Filed: Oct. 23, 2001

Related U.S. Application Data

(63) Continuation of application No. 09/095,457, filed on Jun. 10, 1998, now Pat. No. 6,311,197, which is a continuation-in-part of application No. 08/656,924, filed on Jun. 3, 1996, now Pat. No. 5,918,013, which is a continuation-in-part of application No. 08/660,087, filed on Jun. 3, 1996, now Pat. No. 5,896,444.

(51) Int. Cl.[7] ............................................. G06F 15/173
(52) U.S. Cl. ........................ 709/225; 709/203; 709/217
(58) Field of Search ......................... 709/203, 217–219, 709/225, 229, 231–232, 236; 710/39–40; 707/1, 500; 713/155, 170

(56) References Cited

U.S. PATENT DOCUMENTS 4,575,579 A    3/1986   Simon et al. .................. 178/4
4,852,151 A    7/1989   Dittakavi et al. ............. 379/97
4,922,523 A    5/1990   Hashimoto .................... 379/96
4,975,944 A   12/1990   Cho ........................... 379/209

(Continued)

OTHER PUBLICATIONS

Designing large electronic systems, Hilal, et. al., 8th International Conference on Distributed Computing Systems, Washington, DC, IEEE Computer Society Press (ISBN: 0-8186-0865-X), Jun. 1988, pp. 402–409.*

Administrator's Guide, Netscape Proxy Server Version 2.0, Netscape Communications Corporation, pp. 19–20, 1996.

Chankhunthod, Anawat et al., "A Hierarchical Internet Object Cache," 1996 USEWIX Techical Conference (6 pages).

(Continued)

Primary Examiner—B. Prieto
(74) Attorney, Agent, or Firm—Workman Nydegger

(57) ABSTRACT

A server system provides a client system with access to a number of services. For each service, if a given service provider is overloaded or if the client is unable to contact that provider, the client can contact another service provider capable of providing the requested service. The server system provides information to the client system identifying a list of services that the server system provides. For each service in the list of services, the information may include a service name identifying the service, and a unique port identifying each service provider for that service, so that one service name can be used in accessing multiple service providers of a desired service. A request from the client may include a service name identifying the desired service, and a port selected from ports provided by the server system that corresponds to a service provider for the desired service.

23 Claims, 13 Drawing Sheets

U.S. PATENT DOCUMENTS

| | | | | |
|---|---|---|---|---|
| 4,995,074 A | | 2/1991 | Goldman et al. | 379/97 |
| 5,005,011 A | | 4/1991 | Perlman et al. | 340/728 |
| 5,095,494 A | | 3/1992 | Takahashi et al. | 375/10 |
| 5,220,420 A | | 6/1993 | Hoarty et al. | 358/86 |
| 5,241,587 A | | 8/1993 | Horton et al. | 379/92 |
| 5,263,084 A | | 11/1993 | Chaput et al. | 379/215 |
| 5,287,401 A | | 2/1994 | Lin | 379/98 |
| 5,299,307 A | | 3/1994 | Young | 395/161 |
| 5,325,423 A | | 6/1994 | Lewis | 379/90 |
| 5,329,619 A | | 7/1994 | Page et al. | 395/200 |
| 5,341,293 A | | 8/1994 | Vertelney et al. | 364/419.17 |
| 5,341,477 A | | 8/1994 | Pitkin et al. | 395/200 |
| 5,369,688 A | | 11/1994 | Tsukamoto et al. | 379/100 |
| 5,410,541 A | | 4/1995 | Hotto | 370/76 |
| 5,425,092 A | | 6/1995 | Quirk | 379/215 |
| 5,469,540 A | | 11/1995 | Powers, III et al. | 395/158 |
| 5,488,411 A | | 1/1996 | Lewis | 348/8 |
| 5,490,208 A | | 2/1996 | Remillard | 379/96 |
| 5,530,852 A | | 6/1996 | Meske, Jr. et al. | 395/600 |
| 5,538,255 A | | 7/1996 | Barker | 463/41 |
| 5,548,724 A | | 8/1996 | Akizawa et al. | 395/200.03 |
| 5,548,756 A | | 8/1996 | Tantry et al. | 395/600 |
| 5,558,339 A | | 9/1996 | Perlman | 463/42 |
| 5,561,709 A | | 10/1996 | Remillard | 379/96 |
| 5,564,001 A | | 10/1996 | Lewis | 395/154 |
| 5,572,643 A | | 11/1996 | Judson | 395/793 |
| 5,586,257 A | | 12/1996 | Perlman | 463/42 |
| 5,586,260 A | | 12/1996 | Hu | 395/200.2 |
| 5,612,730 A | | 3/1997 | Lewis | 348/8 |
| 5,623,600 A | | 4/1997 | Ji et al. | 395/187.01 |
| 5,654,886 A | | 8/1997 | Zereski, Jr. et al. | 364/420 |
| 5,657,390 A | | 8/1997 | Elgamal et al. | 380/49 |
| 5,657,450 A | | 8/1997 | Rao et al. | 395/610 |
| 5,671,225 A | * | 9/1997 | Hooper et al. | 370/468 |
| 5,678,041 A | | 10/1997 | Baker et al. | 395/609 |
| 5,706,437 A | | 1/1998 | Kirchner et al. | 395/200.12 |
| 5,724,514 A | * | 3/1998 | Arias | 709/235 |
| 5,727,159 A | * | 3/1998 | Kikinis | 709/246 |
| 5,737,599 A | * | 4/1998 | Rowe et al. | 707/10 |
| 5,774,668 A | | 6/1998 | Choquier et al. | 395/200.53 |
| 5,778,372 A | * | 7/1998 | Cordell et al. | 707/100 |
| 5,802,283 A | | 9/1998 | Grady et al. | 395/200.12 |
| 5,802,367 A | | 9/1998 | Held et al. | 709/332 |
| 5,813,006 A | * | 9/1998 | Polnerow et al. | 707/10 |
| 5,826,085 A | * | 10/1998 | Bennett et al. | 709/316 |
| 5,828,847 A | * | 10/1998 | Gehr et al. | 709/239 |
| 5,860,074 A | * | 1/1999 | Rowe et al. | 707/526 |
| 5,862,348 A | * | 1/1999 | Pedersen | 709/229 |
| 5,903,892 A | | 5/1999 | Hoffert et al. | 707/10 |
| 5,905,248 A | * | 5/1999 | Russell et al. | 235/462.15 |
| 5,948,054 A | | 9/1999 | Nielsen | 709/200 |
| 5,978,817 A | * | 11/1999 | Giannandrea et al. | 707/501 |
| 6,237,099 B1 | | 5/2001 | Kurokawa | |
| 6,269,403 B1 | * | 7/2001 | Anders | 709/231 |

OTHER PUBLICATIONS

Farrow, Rik, "Securing the Web: fire walls, proxy servers, and data driven attacks," InfoWorld, Jun. 19, 1995, vol. 7, No. 25, pp. 103–104.

Rosoff, Matt, Review: "Gateway Destination PC," c/net inc., 2 pages, Feb. 19, 1996.

Seidman, Robert, Article: "What Larry and Lou Know (That You Don't)," c/net inc., 2 pages, Jan. 29, 1996.

Stellin, Susan, Article: "The $500 Web Box: Less is More?" c/net inc., 2 pages, 1996.

*Administrator's Guide, Netscape Proxy Server Version 2.0,* Netscape Communications Corporation, pp. 19–20, 1996.

Chankhunthod, Anawat et al., "A Hierarchical Internet Object Cache," 1996 USEWIX Technical Conference (6 pages).

Farrow, Rik, "Securing the Web: fire walls, proxy servers, and data driven attacks," InfoWorld, Jun. 19, 1995, vol. 7, No. 25, pp. 103–104.

Rosoff, Matt, Review: "Gatway Destination PC," c/net inc., 2 pages, Feb. 19, 1996.

Seidman, Robert, Article: "What Larry and Lou Know (That You Don't)," c/net inc., 2 pages, Jan. 29, 1996.

Stellin, Susan Article: "The $500 Web Box: Less is More?" c/net inc., 2 pages, 1996.

* cited by examiner

METHOD OF IMPROVING ACCESS TO SERVICES PROVIDED BY A PLURALITY OF REMOTE SERVICE PROVIDERS

RELATED APPLICATION

This application is a continuation of U.S. patent application Ser. No. 09/095,457, filed Jun. 10, 1998, now U.S. Pat. No. 6,311,197 entitled, "A method for Downloading a Web Page to a Client for Efficient Display on a Television Screen which is a CIP of Ser. No. 08/656,924 Jun. 3, 1996 U.S. Pat. No. 5,918,013 which is a CIP of Ser. No. 08/660,087 Jun. 3, 1996 U.S. Pat. No. 5,896,444.

BACKGROUND OF THE INVENTION

1. The Field of the Invention

The present invention pertains to the field of client-server computer networking. More particularly, the present invention relates to a method of accessing one or more services from one or more service providers.

2. Background and Related Art

The number of people using personal computers has increased substantially in recent years, and along with this increase has come an explosion in the use of the Internet. One particular aspect of the Internet which has gained widespread use is the World-Wide Web ("the Web"). The Web is a collection of formatted hypertext pages located on numerous computers around the world that are logically connected by the Internet. Advances in network technology and software providing user interfaces to the Web ("Web browsers") have made the Web accessible to a large segment of the population. However, despite the growth in the development and use of the Web, many people are still unable to take advantage of this important resource.

Access to the Web has been limited thus far mostly to people who have access to a personal computer. However, many people cannot afford the cost of even a relatively inexpensive personal computer, while others are either unable or unwillingly to learn the basic computer skills that are required to access the Web. Furthermore, Web browsers in the prior art generally do not provide the degree of user-friendliness desired by some people, and many computer novices do not have the patience to learn how to use the software. Therefore, it would be desirable to provide an inexpensive means by which a person can access the Web without the use of a personal computer. In particular, it would be desirable for a person to be able to access the Web pages using an ordinary television set and a remote control, so that the person feels more as if he or she is simply changing television channels, rather than utilizing a complex computer network.

Prior art Web technology also has other significant limitations which can make a person's experience unpleasant when browsing the Web. Web documents are commonly written in HTML (hypertext Mark-up Language). HTML documents sometimes contain bugs (errors) or have features that are not recognized by certain Web browsers. These bugs or quirks in a document can cause a Web browser to fail. Thus, what is needed is a means for reducing the frequency with which client systems fail due to bugs or quirks in HTML documents.

Another problem associated with browsing the Web is latency. People commonly experience long, frustrating delays when browsing the Web. It is not unusual for a person to have to wait minutes after selecting a hypertext link for a Web page to be completely downloaded to his computer and displayed on his computer screen. There are many possible causes for latency, such as heavy communications traffic on the Internet and slow response of remote servers. Latency can also be caused by Web pages including images. One reason for this effect is that, when an HTML document references an image, it takes time to retrieve the image itself after the referencing document has been retrieved. Another reason is that, in the prior art, if the referencing document does not specify the size of the image, the client system generally cannot display the Web page until the image itself has been retrieved. Numerous others sources of latency exist with respect to the Web. Therefore, what is needed is a means for reducing such latency, to eliminate some of the frustration which typically has been associated with browsing the Web.

An ISP may include numerous physical or logical devices, each device (i.e., service provider) potentially capable of providing several services. Likewise, each service (e.g., email) may be performed by several devices. Often, when an ISP receives a request for a service, the request is directed to a device that is already quite overloaded while another device perfectly capable or processing the request stands relatively idle. Therefore, what is needed is a way to improve the balancing of workloads among the various devices of the ISP.

Security is another concern associated with the Internet. Internet service providers (ISPs) generally maintain certain information about each customer in a database. This information may include information which a customer may not wish to become publicly known, such as social security numbers and credit card numbers. Maintaining the confidentiality of this information in a system that is connected to an expensive publicly-accessible computer network like the Internet can be problematic. Further, the problem can be aggravated by the fact that an ISP often provides numerous different services, each of which has access to this database. Allowing access to the database by many different entities creates many opportunities for security breaches to occur. Therefore, what is needed is a way to improve the security of confidential customer information in a server system coupled to the Internet.

SUMMARY OF THE INVENTION

According to the present invention, a server system provides a client system with access to a number of services. As discussed above, the prior art client-server system suffers in that some devices in the server system are quite busy while other devices are much less busy. In processing a request for a service, the request often waits to be processed by an overloaded device instead of being processed relatively quickly by a less busy device. In the present invention, for a given service, the workload of each device providing that service may be more fully balanced by dynamically changing which device (i.e., service provider) provides the service. For each service, if a given service provider is overloaded or if the client is unable to contact that provider, the client can contact any other of the service providers capable of providing the requested service.

In operation, the server system provides information to the client system identifying a list of services that the server system provides. This information may be provided at any time, such as after the client system logs into the server system. For each service in the list of services, the information may include a service name identifying the service, and at least one unique port identifying each service provider for that service so that one service name can be used in accessing the multiple service providers that provide the desired service.

Ultimately, the client system constructs a request for a service based on the information provided by the client system. The request may include a service name identifying the desired service provided by the server system and at least one port corresponding to a service provider that provides the desired service, the port being selected from the ports provided by the server system.

For purposes of describing the unique load balancing features of this invention, assume, for example, that the server system provides an email service designated by the service name "WTV-mailto." A client system can access any provider of this email service using the same URL (uniform resource locator) such as the service name. The client system merely chooses an appropriate port number from the list of port numbers provided by the server system to distinguish between service providers. If the client is unable to contact the corresponding service provider in the server system, the client tries the next service provider in the server system, using the next port number provided by the server system. Thus, load balancing of the service providers is accomplished for each service offered by the server system.

Other features of the present invention will be apparent from the accompanying drawings and from the detailed descriptions which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for providing proxying and transcoding of documents in a network. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

I. System Overview

The present invention is included in a system, known as WebTV™, for providing a user with access to the Internet. A user of a WebTV™ client generally accesses a WebTV™ server via a direct-dial telephone (POTS, for "plain old telephone service"), ISDN (Integrated Services Digital Network), or other similar connection, in order to browse the Web, send and receive electronic mail (e-mail), and use various other WebTV™ network services. The WebTV™ network services are provided by WebTV™ servers using software residing within the WebTV™ servers in conjunction with software residing within a WebTV™ client.

Figure 1:
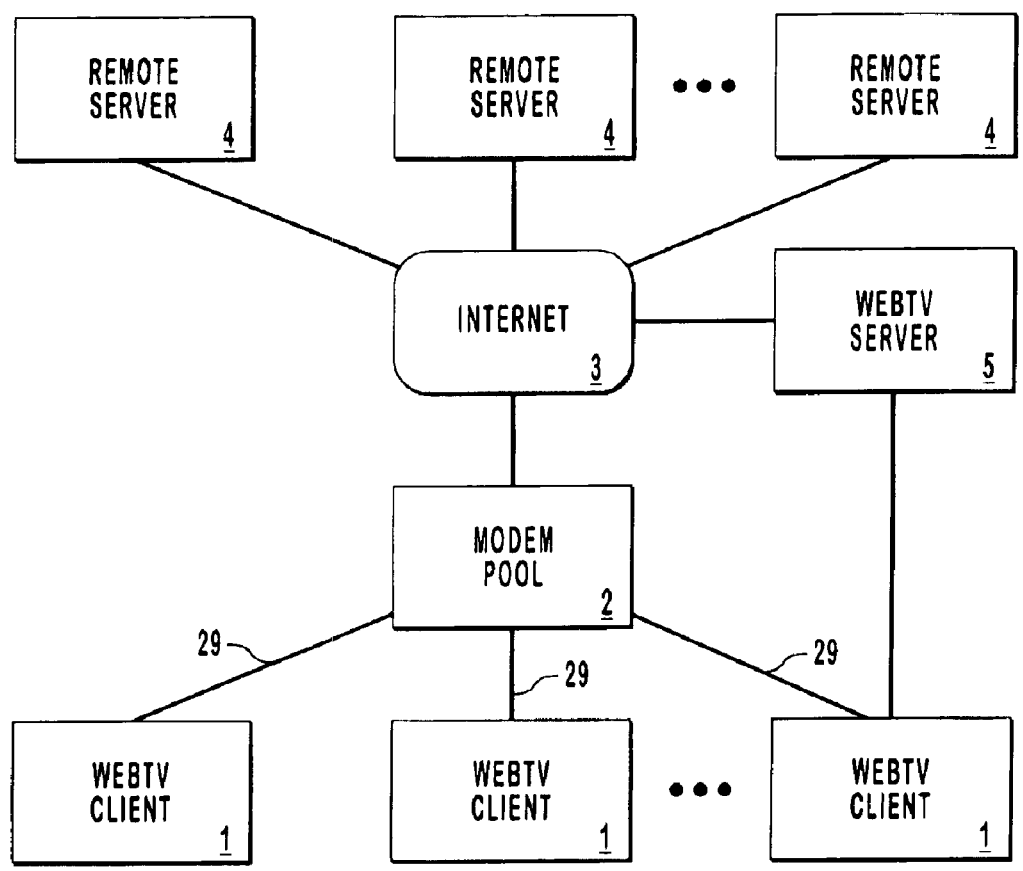
FIG. 1 illustrates several clients connected to a proxying server in a network.

FIG. 1 illustrates a basic configuration of the WebTV™ network according to one embodiment. A number of WebTV™ clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, Such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server either directly or through the modem pool 2 and the Internet 3. Note that the modem pool 2 is a conventional modem pool such as those found today throughout the world providing access to the Internet and private networks.

Note that in this description, in order to facilitate explanation the WebTV™ server 5 is generally discussed as if it were a single device, and functions provided by the WebTV™ services are generally discussed as being performed by such single device. However, the WebTV™ server 5 may actually comprise multiple physical and logical devices connected in a distributed architecture, and the various functions discussed below which are provided by the WebTV™ services may actually be distributed among multiple WebTV™ server devices.

II. Client System

Figure 2:
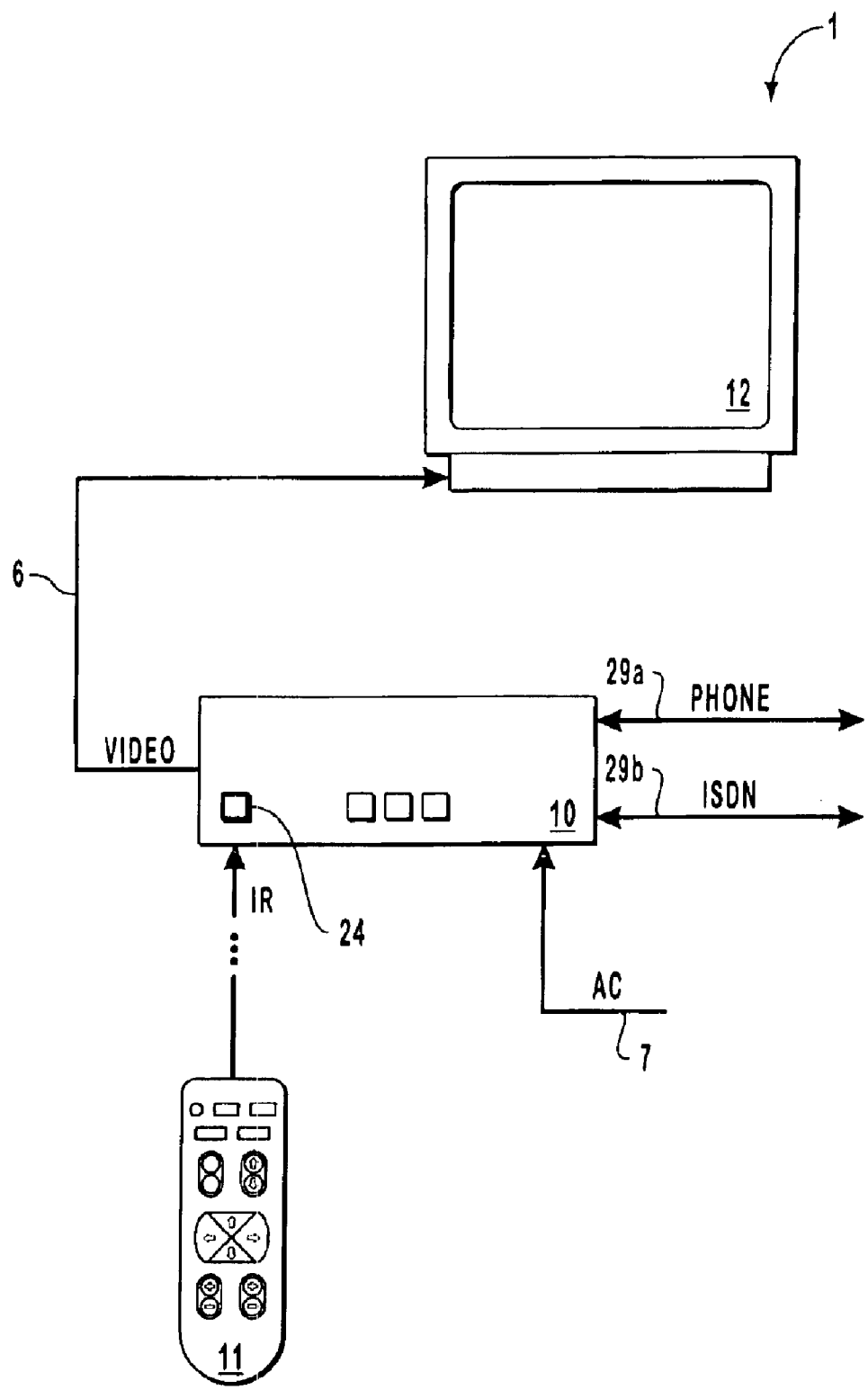
FIG. 2 illustrates a client according to the present invention.

FIG. 2 illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the Web, send e-mail, and otherwise access the Internet.

The WebTV™ client 1 uses the television set 12 as a display device. The WebTV™ box 10 is coupled to the television set 12 by a video link 6. The video link 6 is an RF (radio frequency), S-video, composite video, or other equivalent form of video link. In the preferred embodiment, the client 1 includes both a standard modem and an ISDN modem, such that the communication link 29 between the WebTV™ box 10 and the server 5 can be either a telephone (POTS) connection 29a or an ISDN connection 29b. The WebTV™ box 10 receives power through a power line 7.

Remote control 11 is operated by the user in order to control the WebTV™ client 1 in browsing the Web, sending e-mail, and performing other Internet-related functions. The WebTV™ box 10 receives commands from remote control 11 via an infrared (IR) communication link. In alternative embodiments, the link between the remote control 11 and the WebTV™ box 10 may be RF or any equivalent mode of transmission.

III. Server System

Figure 3:
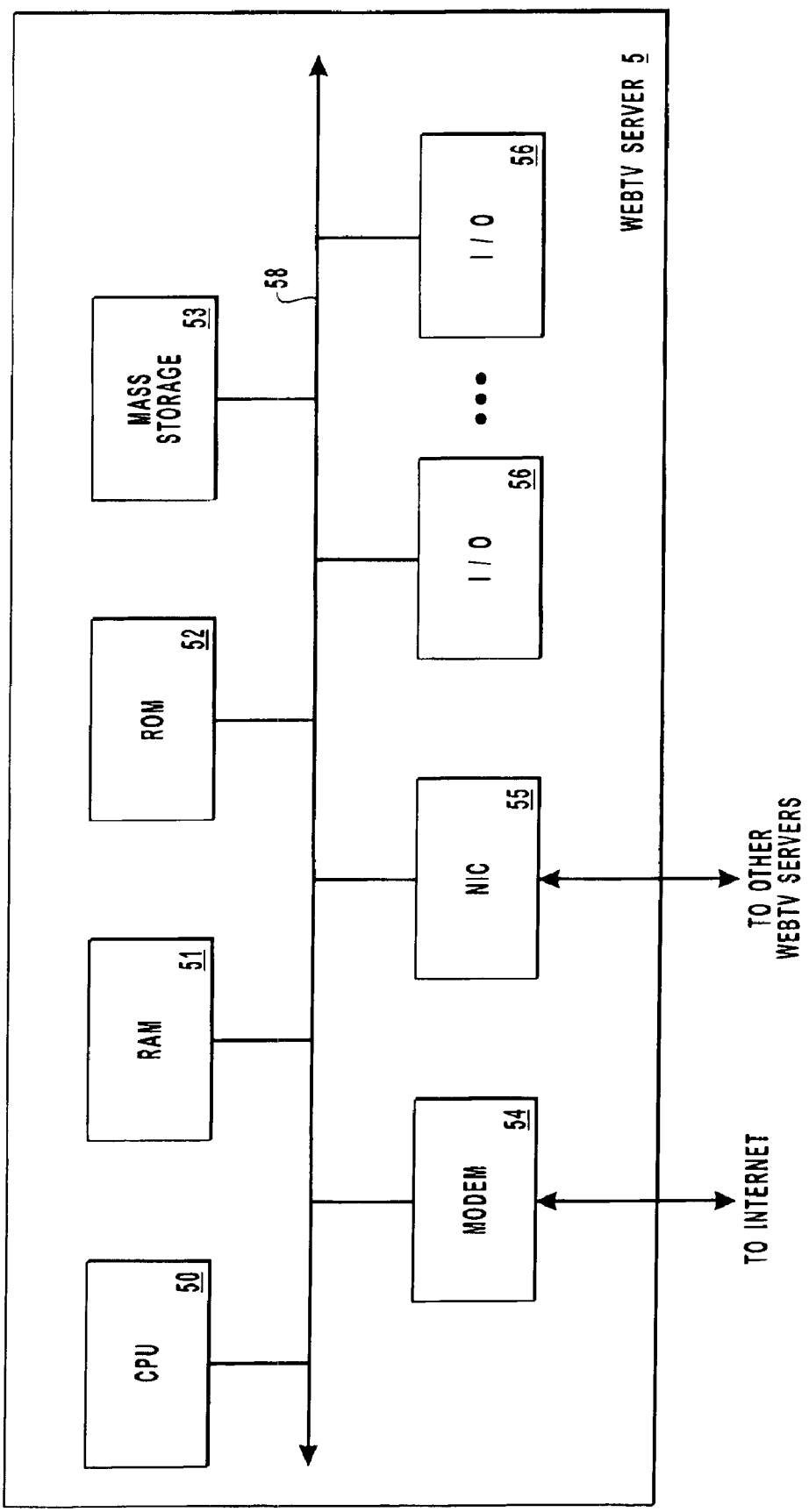
FIG. 3 is a block diagram of a server according to the present invention.

The WebTV™ server 5 generally includes one or more computer systems generally having the architecture illustrated in FIG. 3. It should be noted that the illustrated architecture is only exemplary; the present invention is not constrained to this particular architecture. The illustrated architecture includes a central processing unit (CPU) 50, random access memory (RAM) 51, read-only memory (ROM) 52, a mass storage device 53, a modem 54, a network interface card (NIC) 55, and various other input/output (I/O) devices 56. Mass storage device 53 includes a magnetic, optical, or other equivalent storage medium. I/O devices 56 may include any or all of devices such as a display monitor, keyboard, cursor control device, etc . . . . Modem 54 is used to communicate data to and from remote servers 4 via the Internet.

As noted above, the WebTV™ server 5 may actually comprise multiple physical and logical devices connected in a distributed architecture. Accordingly, NIC 55 is used to provide data communication with other devices that are part of the WebTV™ services. Modem 54 may also be used to communicate with other devices that are part of the WebTV™ services and which are not located in close geographic proximity to the illustrated device.

According to the present invention, the WebTV™ server 5 acts as a proxy in providing the WebTV™ client 1 with access to the Web and other WebTV™ services. More specifically, WebTV™ server 5 functions as a "caching proxy."

Figure 4A:
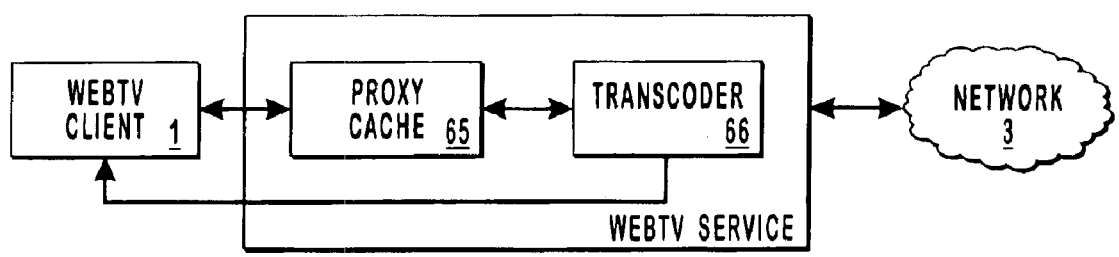
FIG. 4A illustrates a Server including a proxy cache and a transcoder.

FIG. 4A illustrates the caching feature of the WebTV™ server 5. In FIG. 4A, the WebTV™ server 5 is functionally located between the WebTV™ client and the Internet infrastructure 3. The WebTV™ server 5 includes a proxy cache 65 which is functionally coupled to the WebTV™ client 1. The proxy cache 65 is used for temporary storage of Web documents, images, and other information which is frequently used by either the WebTV™ client 1 or the WebTV™ server 5.

A document transcoder 66 is functionally coupled between the proxy cache 65 and the Internet infrastructure 3. The document transcoder 66 includes software which is used to automatically revise the code of Web documents retrieved from the remote servers 4, for purposes which are described below.

Figure 4B:
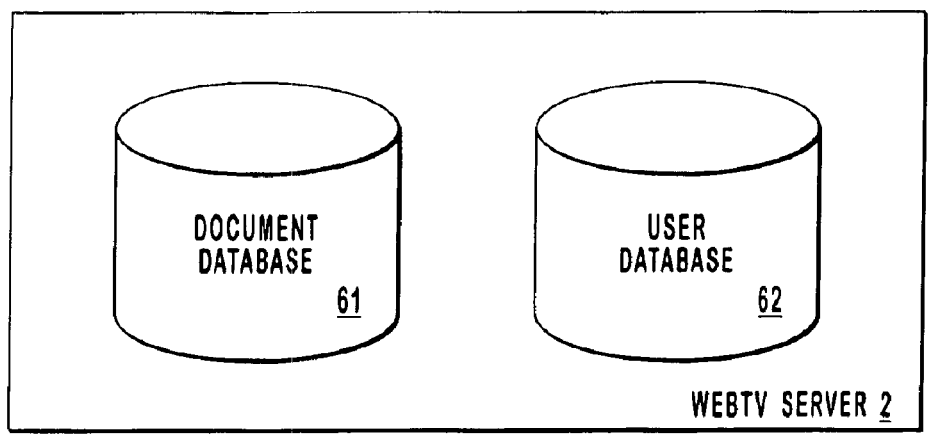
FIG. 4B illustrates databases used in a server according to the present invention.

The WebTV™ service provides a document database 61 and a user database 62, as illustrated in FIG. 4B. The user database 62 contains information that is used to control certain features relating to access privileges and capabilities of the user of the client 1. This information is used to regulate initial access to the WebTV™ service, as well as to regulate access to the individual services provided by the WebTV™ system, as will be described below. The document database 61 is a persistent database which stores certain diagnostic, and historical information about each document and image retrieved by the server 5, as is now described.

A. Document Database

Figure 5:
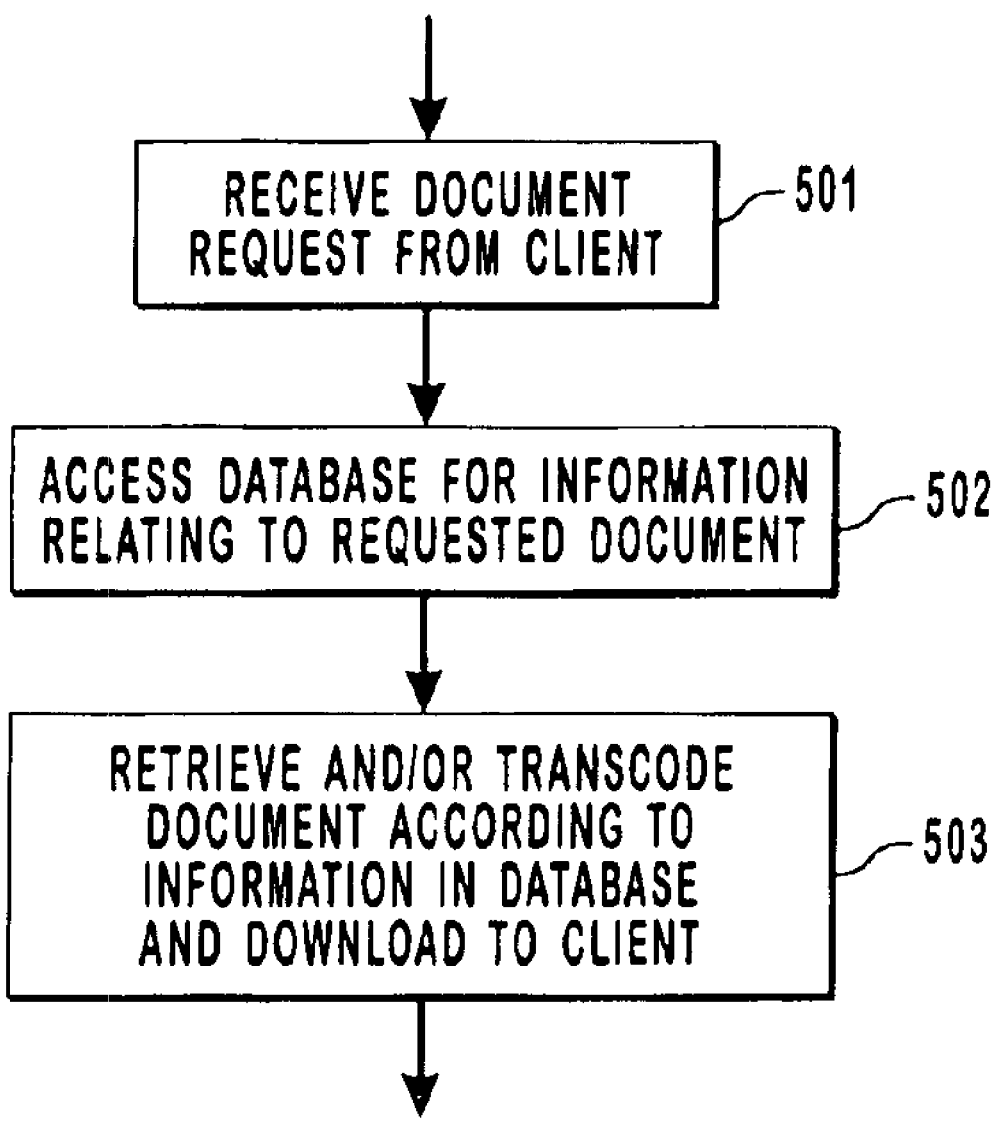
FIG. 5 is a flow diagram illustrating a routine for transcoding a document retrieved from a remote server using data stored in a persistent database.

The basic purpose of the document database 61 is that, after a document has once been retrieved by the server the stored information can be used by the server 5 to speed up processing and downloading of that document in response to all future requests for that document. In addition, the transcoding functions and various other functions of the WebTV™ service are facilitated by making use of the information stored in the document database 61, as will be described below. Referring now to FIG. 5, the server 5 initially receives a document request from a client 1 (step 501). The document request will generally result from the user of the client 1 activating a hypertext anchor (link) on a Web page.

The act of activating a hypertext anchor may consist of clicking on underlined text in a displayed Web page using a mouse, for example. The document request will typically (but not always) include the URL (Uniform Resource Locator) or other address of the selected anchor. Upon receiving the document request, the server 5 optionally accesses the document database 62 to retrieve stored information relating to the requested document (step 502). It should be noted that the document database 62 is not necessarily accessed in every case. The information retrieved from the document database 62 is used by the server 5 for determining, among other things, how long a requested document has been cached and/or whether the document is still valid. The criteria for determining validity of the stored document are discussed below. The server 5 retrieves the document from the cache 65 if the stored document is valid; otherwise, the server 5 retrieves the document from the appropriate remote server 4 (step 503). The server 5 automatically transcodes the document as necessary based on the information stored in the document database 61 (step 503). The transcoding functions are discussed further below.

The document database 61 includes certain historical and diagnostic information for every Web page that is accessed at any time by a WebTV™ client 1. As is well known, a Web page may correspond to a document written in a language such as HTML (Hypertext Mark-Up Language), VRML (Virtual Reality Modeling Language), or another suitable language. Alternatively, a Web page may represent an image, or a document which references one or more images. According to the present invention, once a document or image is retrieved by the WebTV™ server 5 from a remote server 4 for the first time, detailed information on this document or image is stored permanently in the document database 61. More specifically, for every Web page that is retrieved from a remote server 4, any or all of the following data are stored in the document database 61:

1) information identifying bugs (errors) or quirks in the Web page, or undesirable effects caused when the Web page is displayed by a client 1;
2) relevant bug-finding algorithms;
3) the date and time the Web page was last retrieved;
4) the date and time the Web page was most recently altered by the author,
5) a checksum for determining whether the Web page has been altered;
6) the size of the Web page (in terms of memory);
7) the type of Web page (e.g., HTML document, image, etc.);
8) a list of hypertext anchors (links) in the Web page and corresponding URLs;
9) a list of the most popular anchors based on the number of "hits" (requests from a client 1);
10) a list of related Web pages which can be prefetched;
11) whether the Web page has been redirected to another remote server 4;
12) a redirect address (if appropriate);
13) whether the redirect (if any) is temporary or permanent, and if permanent, the duration of the redirect;
14) if the Web page is an image, the size of the image in terms of both physical dimensions and memory space;
15) the sizes of in-line images (images displayed in text) referenced by the document defining the Web page;
16) the size of the largest image referenced by the document;
17) information identifying any image maps in the Web page;
18) whether to resize any images corresponding to the Web page;
19) an indication of any forms or tables in the Web page;
20) any unknown protocols;
21) any links to "dead" Web pages (i.e., pages which are no longer active);
22) the latency and throughput of the remote server 4 on which the Web page is located;
23) the character set of the document;
24) the vendor of the remote server 4 on which the Web page is located;
25) the geographic location of the remote server 4 on which the Web page is located;
26) the number of other Web pages which reference the subject Web page;
27) the compression algorithm used by the image or document;
28) the compression algorithm chosen by the transcoder;
29) a value indicating the popularity of the Web page based on the number of hits by clients; and
30) a value indicating the popularity of other Web pages which reference the subject Web page.

B. Transcoding

As mentioned above, the WebTV™ services provide a transcoder 66, which is used to rewrite certain portions of the code in an HTML document for various purposes. These purposes include: (1) correcting bugs in documents; (2) correcting undesirable effects which occur when a document is displayed by the client 1; (3) improving the efficiency of transmission of documents from the server 5 to the client 1; (4) matching hardware decompression technology within the client 1; (5) resizing images to fit on the television set 12; (6) converting documents into other formats to provide compatibility; (7) reducing latency experienced by a client 1 when displaying a Web page with in-line images (images displayed in text); and, (8) altering documents to fit into smaller memory spaces.

There are three transcoding modes used by the transcoder 66: (1) streaming, (2) buffered, and (3) deferred. Streaming transcoding refers to the transcoding of documents on a line-by-line basis as they are retrieved from a remote server 4 and downloaded to the client 1 (i.e., transcoding "on the fly"). Some documents, however, must first be buffered in the WebTV™ server 5 before transcoding and downloading them to the client 1. A document may need to be buffered before transmitting it to the client 1 if the type of changes to be made can only be made after the entire document has been retrieved from the remote server 4. Because the process of retrieving and downloading a document to the client 1 increases latency and decreases throughput, it is not desirable to buffer all documents. Therefore, the transcoder 66 accesses and uses information in the document database 61 relating to the requested document to first determine whether a requested document must be buffered for purposes of transcoding, before the document is retrieved from the remote server 4.

In the deferred mode, transcoding is deferred until after a requested document has been downloaded to a client 1. The deferred mode therefore reduces latency experienced by the client 1 in receiving the document. Transcoding may be performed immediately after downloading or any time thereafter. For example, it may be convenient to perform transcoding during periods of low usage of WebTV™ services, such as at night. This mode is useful for certain types of transcoding which are not mandatory.

1. Transcoding for Bugs and Quirks

One characteristic of some prior art Web browsers is that they may experience failures ("crashes") because of bugs or unexpected features ("quirks") that are present in a Web document. Alternatively, quirks in a document may cause an undesirable result, even though the client does not crash. Therefore, the transcoding feature of the present invention provides a means for correcting certain bugs and quirks in a Web document. To be corrected by the transcoder 66, bugs and quirks must be identifiable by software running on the server 5. Consequently, the transcoder 66 will generally only correct conditions which have been previously discovered, such as those discovered during testing or reported by users. Once a bug or quirk is discovered, however, algorithms are added to the transcoder 66 to both detect the bug or quirk in the future in any Web document and to automatically correct it.

There are countless possibilities of bugs or quirks which might be encountered in a Web document. Therefore, no attempt will be made herein to provide an exhaustive list. Nonetheless, some examples may be useful at this point. Consider, for example, an HTML document that is downloaded from a remote server 4 and which contains a table having a width specified in the document as "0." This condition might cause a failure if the client were to attempt to display the document as written. This situation therefore, can be detected and corrected by the transcoder 66. Another example is a quirk in the document which causes quotations to be terminated with too many quotation marks. Once the quirk is first detected and an algorithm is written to recognize it, the transcoder 66 can automatically correct the quirk in any document.

If a given Web document has previously been retrieved by the server 5, there will be information regarding that document available in the document database 61 as described above. The information regarding this document will include whether or not the document included any bugs or quirks that required transcoding when the document was previously retrieved. The transcoder 66 utilizes this information to determine whether (1) the document is free of bugs and quirks, (2) the document has bugs or quirks which can be remedied by transcoding on the fly, or (3) the document has bugs or quirks which cannot be corrected on the fly (i.e., buffering is required).

Figure 6:
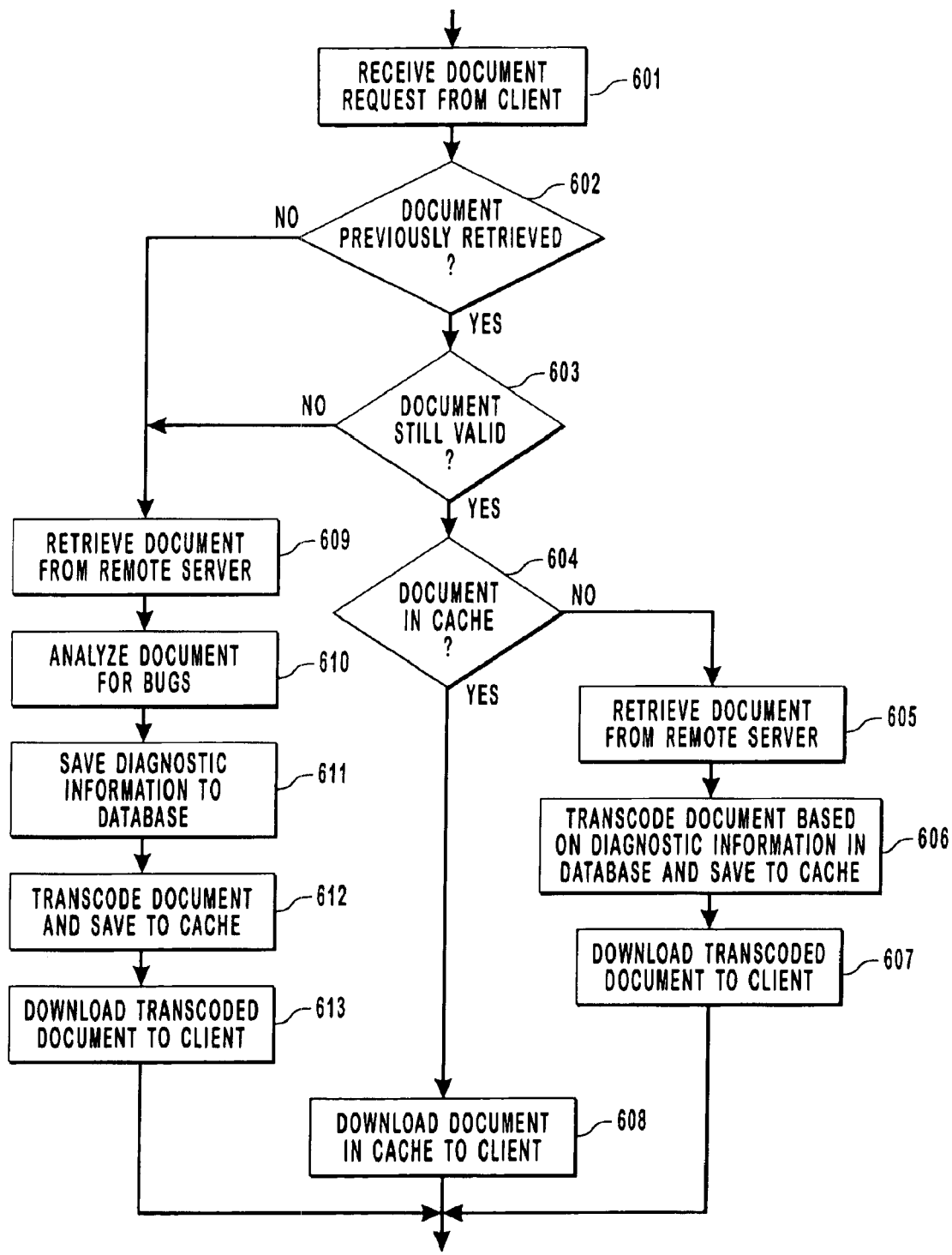
FIG. 6 is a flow diagram illustrating a routine for transcoding an HTML document for purposes of eliminating bugs or undesirable features.

FIG. 6 illustrates a routine for transcoding a Web document for purposes of eliminating bugs and quirks. Initially, the server 5 receives a document request from the client 1 (step 601). Next, the document database 61 is accessed to determine whether or not the requested document has been previously retrieved (step 602). If the document has not been previously retrieved, then the server 5 retrieves the document from the remote server 4 (step 609). Next, the retrieved document is analyzed for the presence of bugs or unusual conditions (step 610). Various diagnostic information is then stored in the document database 61 as a result of the analysis to note any bugs or quirks that were found (step 611). If any bugs or quirks were found which can be corrected by the transcoder 66, the document is then transcoded and saved to the proxy cache 65 (step 612). The transcoded document is then downloaded to the client 1 (step 613). It should be noted that transcoding can be deferred until after the document has been downloaded, as described above; hence, the sequence of FIG. 6 is illustrative only.

If (in step 602) the requested document had been previously retrieved, then it is determined whether the requested document is still valid (step 603) and whether the document is present in the proxy cache 65 (step 604). If the document is no longer valid, then the document is retrieved from the remote server 4, analyzed for bugs and quirks, transcoded as required, and then downloaded to the client 1 as: described above (steps 610–613, step 607). Methods for determining validity of a document are discussed below. If the document is still valid (step 603) and the document is present in the cache 65, the document is downloaded to the client 1 in its current form (as it is stored in the cache), since it has already been transcoded (step 608).

The document, however, may be valid but not present in the cache. This may be the case, for example, if the document has not been requested recently and the cache 65 has become too full to retain the requested document. In that case, the document is retrieved again from the remote server 4 (step 605) and then transcoded on the basis of the previously acquired diagnostic information stored within the database 61 for that document. The document is then saved to the cache 65 (step 606). Note that because the document is still valid, it is assumed that the diagnostic information stored in the document database 61 for that document is still valid and that the transcoding can be performed on the basis of that information. Accordingly, once the document is transcoded, the transcoded document is downloaded to the client 1 (step 607). Again, note that transcoding can be deferred until after the document has been downloaded in some cases.

The validity of the requested document can be determined based on various different criteria. For example, some, HTML documents specify a date on which the document was created, a length of time for which the document will be valid, or both. The validity determination can be based upon such information. For example, a document, which specifies only the date of creation, can be automatically deemed invalid after a predetermined period of time has passed.

Alternatively, validity can be based upon the popularity of the requested document. "Popularity" can be quantified based upon the number of hits for that document, which is tracked in the document database 61. For example, it might be prudent to simply assign a relatively short period of validity to a document which is very popular and a longer period of validity to a document which is less popular.

Another alternative basis for the validity of a document is the observed rate of change of the document. Again, data in the persistent document database 61 can be used. That is, because the document database 61 stores the date and time on which the document was last observed to change, the server 5 can approximate how often the document actually changes. A document or image which is observed to change frequently (e.g., a weather map or a news page) can be assigned a relatively short period of validity. It will be recognized that numerous other ways of determining validity are possible.

2. Transcoding to Reduce Latency

Another purpose for transcoding is to allow documents requested by a client 1 to be displayed by the client 1 more rapidly. Many HTML documents contain references to "in-line"images, or images that will be displayed in text in a Web page. The normal process used in the prior art to display a Web page having in-line images is that the HTML document referencing the image is first downloaded to the client, followed by the client's requesting the referenced image. The referenced image is then retrieved from the remote server on which, it is located and downloaded to the client. One problem associated with the prior art, however, is that the speed with which a complete Web page can be displayed to the user is often limited by the time it takes to retrieve in-line images. One reason for this is that it simply takes time to retrieve the image itself after the referencing document has been retrieved. Another reason is that in the prior art, if the referencing document does not specify the size of the image, the Web page generally cannot be displayed until the image itself has been retrieved. The present invention overcomes these limitations.

According to the present invention, information stored in the document database 61 regarding the in-line images is used to transcode the referencing document in order to reduce latency in displaying the Web page. Once any document which references an in-line image is initially retrieved by the server 5, the fact that the document references an in-line image is stored in the document database. In addition, the size of the image is determined, either from the document (if specified) or from the image itself1 and then stored in the document database 61. Consequently, for documents which do not specify the size of their in-line images, the size information stored in the database 61 is then used the next time the document is requested in order to reduce latency in downloading and displaying the Web page.

Figure 7A:
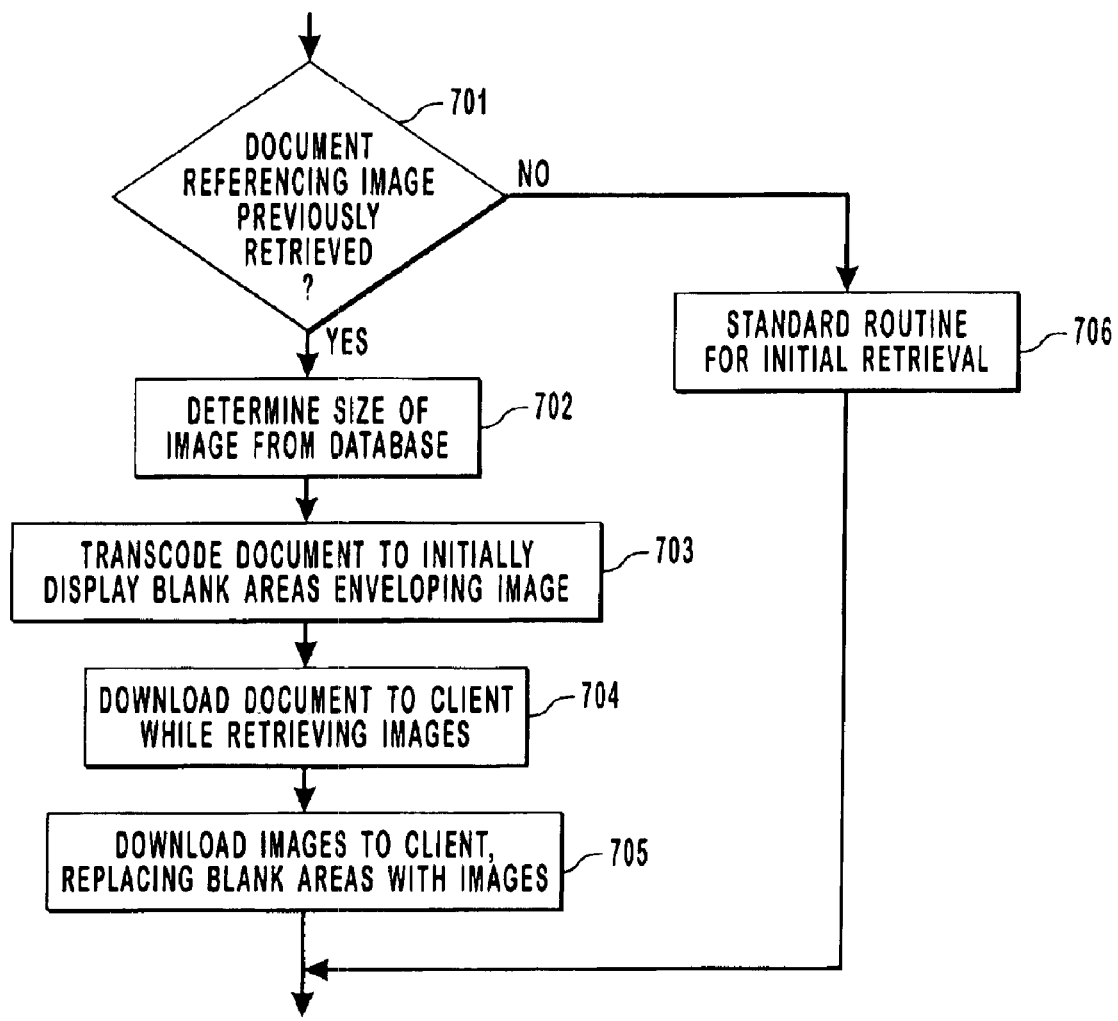
FIG. 7A is a flow diagram illustrating a routine for reducing latency when downloading a document referencing an image to a client.

Refer now to FIG. 7A, which illustrates a routine for reducing latency when downloading a document referencing an image to a client 1. Assume that a client 1 sends a request to the server 5 for an HTML document containing a reference to an in-line image. Assume further that the size of the image is not specified in the document itself. Initially, the server 5 determines whether that document has been previously retrieved (step 701). If not, the standard initial retrieval and transcoding procedure is followed (step 706), as described in connection with FIG. 6. If, however, the document has been previously retrieved, then the transcoder 66 accesses the size information stored in the document database 61 for the in-line image (step 702). Based on this size information, the HTML document is transcoded such that, when the Web page is initially displayed by the client 1, the area in which the image belongs is replaced by a blank region enveloping the shape of the image (step 703). Thus, any in-line image referenced by a document is displayed initially as a blank region. Consequently, the client 1 can immediately display the Web page corresponding to the HTML document even before the referenced image has been retrieved or downloaded (i.e., even before the size of the image is known to the client 1).

As the transcoded HTML document is downloaded to the client, the image is retrieved from the appropriate remote server 4 (step 704). Once the image is retrieved from the remote server 4 and downloaded to the client 1, the client 1 replaces the blank area in the Web page with the actual image (step 705).

3. Transcoding to Display Web Pages on a Television

As noted above, the client 1 utilizes an ordinary television set 12 as a display device. However, images in Web pages are generally formatted for display on a computer monitor, not a television set. Consequently, the transcoding function of the present invention is used to resize images for display on the television set 12. This includes rescaling images as necessary to avoid truncation when displayed on the television set 12.

It should be noted that prior art Web browsers which operate on computer monitors typically use resizable windows. Hence, the size of the visible region varies from client to client. However, because the web browser used by the WebTV™ client 1 is specifically designed for display on a television set, the present invention allows documents and images to be formatted when they are cached.

As mentioned previously, prior art servers generally download all of the HTML data, or non-image data, of a Web page to a client and then subsequently download the image data to the client when displaying a Web page, without consideration of the viewable display area of the screen. A trade-off with this prior art approach is that it optimizes total Web page throughput at the expense of the time required to update the viewable display area of the screen. Although this problem may not be as noticeable on computers with large monitors having large display areas, this problem is more noticeable on displays with relatively smaller viewer areas, such as for example a television set 12 coupled to WebTV™ client 1.

In another aspect of the present invention, server 5 addresses this issue by taking into consideration the viewable display area of the screen and thus changing the order in which Web based information is downloaded from server 5 to WebTV™ client 1 for the efficient display of a Web page on television set 12. In this embodiment, server 5 reorders the Web page information such that all of the non-image data and image data that appears within the viewable display area of the screen of television set 12 is downloaded before the non-image data and image data of the Web page that is outside the viewable display area of the screen of television set 12 is downloaded. As a result, the overall time required by WebTV™ client 1 to fully generate and display just the portion of the Web page within the viewable display area of television set 12 is reduced.

Figure 7B:
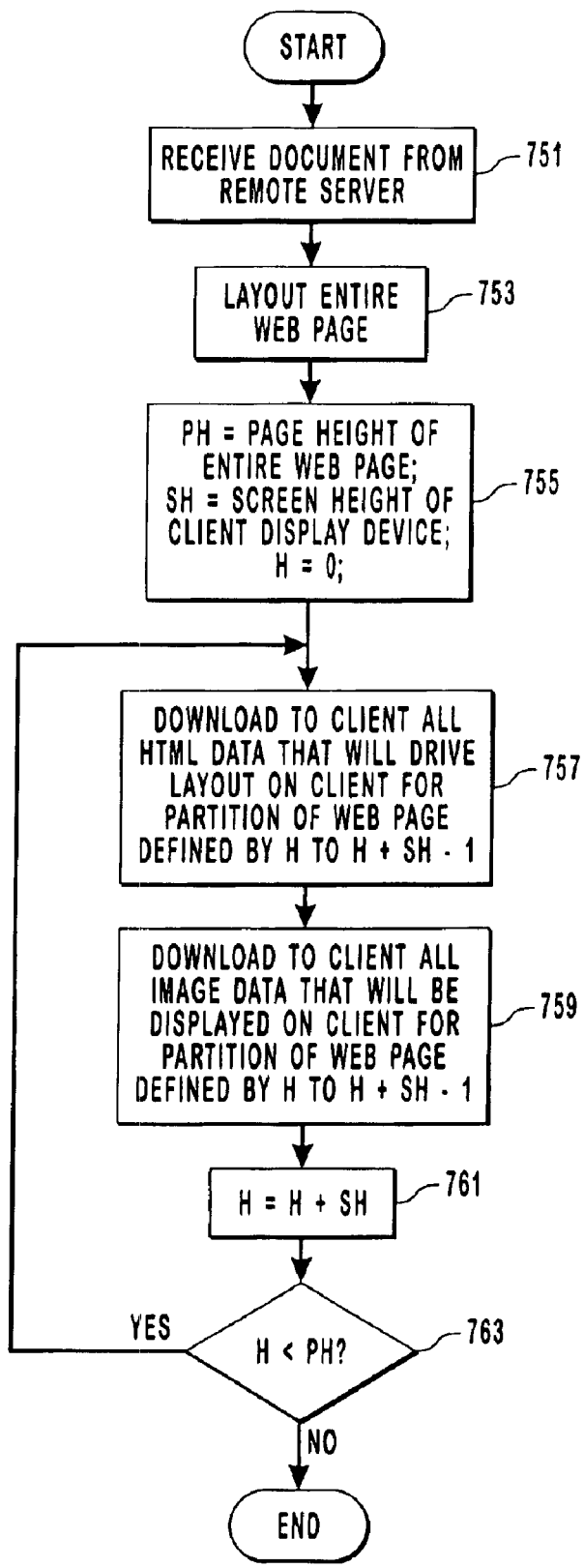
FIG. 7B is a flow diagram illustrating a routine for efficiently downloading a document to a client for efficient display of a Web page on a television screen.

FIG. 7B is a flow diagram illustrating the steps performed to efficiently download Web page data from server 5 to a WebTV™ client 1 for efficient display within the viewable display area of a television screen in accordance with the teachings of the present invention. Assume that WebTV™ client 1 sends a request to server 5 for a document that is used to generate a Web page. Assume further that the document contains non-image data, such as for example HTML data, and image data. Assume also that the overall size of the Web page is such that the entire Web page cannot be displayed on a single screen of television set 12.

Initially, server 5 receives the document that defines the Web page from remote server 4 (step 751). After the document has been received from remote server 4, server 5 lays out the entire Web page defined by the received document using well-known techniques (step 753). Alter the entire Web page has been laid out in server 5, the Web page may be separated or partitioned into a plurality of viewable portions or partitions, such that each partition corresponds to one screen of Web page information viewable 6n the television screen. In one embodiment, one television screen of Web page information corresponds to the viewable display height of the television screen.

In one embodiment, the page height of the entire Web page defined by the document is assumed to equal PH and the display or screen height of television set 12 coupled to WebTV™ client 1 is presumed to equal SH (step 755). A variable H is also initialized to a value of 0 (step 755). Next, all of the non-image data that drives the layout on WebTV™ client 1 within the viewable display area on television set 12 is downloaded to WebTV™ client 1. In one embodiment, this non-image data that is transmitted or downloaded includes all of the HTML data that drives the layout on WebTV™ client 1 within the partition of the Web page defined by the region H to H+SH−1 (step 757). After all the non-image data that drives the layout within the viewable display area on the screen of television set 12 has been downloaded, server 5 then downloads to WebTV™ client 1 all of the image data that is displayed within the viewable display area of the screen of television Set 12. The image data downloaded from server 5 to WebTV™ client 1 is defined to be the image data displayed by the client within the partition of the Web page defined by H to H+SH−1 (step 759).

After the non-image data and image data have been downloaded as described from server 5 to WebTV™ client 1 for a first television screen of Web page information, server 5 then sequentially repeats the steps of downloading the non-image data and the image data for each of the remaining viewable television screens of the Web page information until all of the television screens of the Web page have been downloaded from server 5 to WebTV™ client 1. In one embodiment, each remaining television screen of the Web page information is not downloaded until all of the non-image data and image data of a previous television screen Web page have been fully transmitted or downloaded.

Referring back to FIG. 7B the remaining partitions, or television screens of the Web page information, are downloaded from server 5 to WebTV™ client 1 according to the following remaining steps. After step 759, H is incremented by SH (step 761). If H is less than PH, then processing is looped back to step 757 (step 763). If H is not less than PH, then all of the partitions, or television screens of the Web page, have been downloaded from server 5 to WebTV™ client 1. By reordering the Web page information as described, each television screen of a Web page information is efficiently downloaded from server 5 to WebTV™ client 1 and may therefore be fully generated and displayed on television set 12 in a reduced amount of time.

4. Transcoding for Transmission Efficiency

Documents retrieved by the server 5 are also transcoded to improve transmission efficiency. In particular, documents can be transcoded in order to reduce high frequency components in order to reduce interlace flicker when they are displayed on a television set. Various methods for coding software or hardware to reduce perceptual interlace flicker are described in U.S. Pat. No. 5,862,220.

Documents can also be transcoded in order to lower the resolution of the displayed Web page. Reducing the resolution is desirable, because images formatted for computer Systems will generally have a higher resolution than the NTSC (National Television Standards Committee) video format used by conventional television sets. Since the NTSC video does not have the bandwidth to reproduce the resolution of computer-formatted images, the bandwidth consumed in transmitting images to the client 1 at such a high resolution would be wasted.

5. Other Uses for Transcoding

Transcoding is also used by the present invention to recode a document using new formats into older, compatible formats. Images are often displayed in the JPEG (Joint Picture Experts Group) format or the GIF image format. JPEG often consumes less bandwidth than GIF, however. Consequently, images which are retrieved in GIF format are sometimes transcoded into JPEG format. Methods for generally converting images between GIF and JPEG formats are well known.

Other uses for transcoding include transcoding audio files. For example, audio may be transcoded into different formats in order to achieve a desired balance between memory usage, sound quality, and data transfer rate. In addition, audio may be transcoded from a file format (e.g., an ".AU" file) to a streaming format (e.g., MPEG 1 audio). Yet another use of audio transcoding is the transcoding of MIDI (Musical Instrument Digital Interface) data to streaming variants of MIDI.

Additionally, documents or images requiring a large amount of memory (e.g., long lists) can be transcoded in order to consume less memory space in the client 1. This may involve, for example, separating a large document or image into multiple sections. For example, the server 5 can insert tags at appropriate locations in the original document so that the document appears to the client 1 as multiple Web pages. Hence, while viewing a given page representing a portion of the original document, the user can view the next page (i.e., the next portion of the original document) by activating a button on the screen as if it were an ordinary hypertext anchor.

C. Proxying

As noted above, the server 5 functions as a proxy on behalf of the client 1 for purposes of accessing the Web. The document database 61 is used in various ways to facilitate this proxy role, as will now be described.

1. Updating Cached Documents

It is desirable to store frequently requested HTML documents and images in the proxy cache 65 to further reduce latency in providing Web pages to the client 1. However, because some documents and images change over time, documents in the cache 65 will not be valid indefinitely, as mentioned above. A weather map or a news-related Web page, for example, are likely to be updated quite frequently. Consequently, it is desirable for the server 5 to have the ability to estimate the frequency with which documents change, in order to determine how long a document can safely remain within the proxy cache 65 without being updated.

The persistent database 65 is used to store the date and time of the last several fetches of each document and image retrieved from a remote server 4, along with an indication of any changes that were detected, if any. A document or image which has been stored in the cache 65 is then retrieved on a periodic basis to determine if it has been changed. Change status information indicating whether the document has changed since the previous fetch is then stored in the document database 61. If no changes are detected, then the time interval between fetches of this document is increased. If the document has changed, the time interval is maintained or decreased. As a result, items in the cache 65 which change frequently will be automatically updated at frequent intervals, whereas documents which do not change often will be replaced in the cache less frequently.

Figure 8:
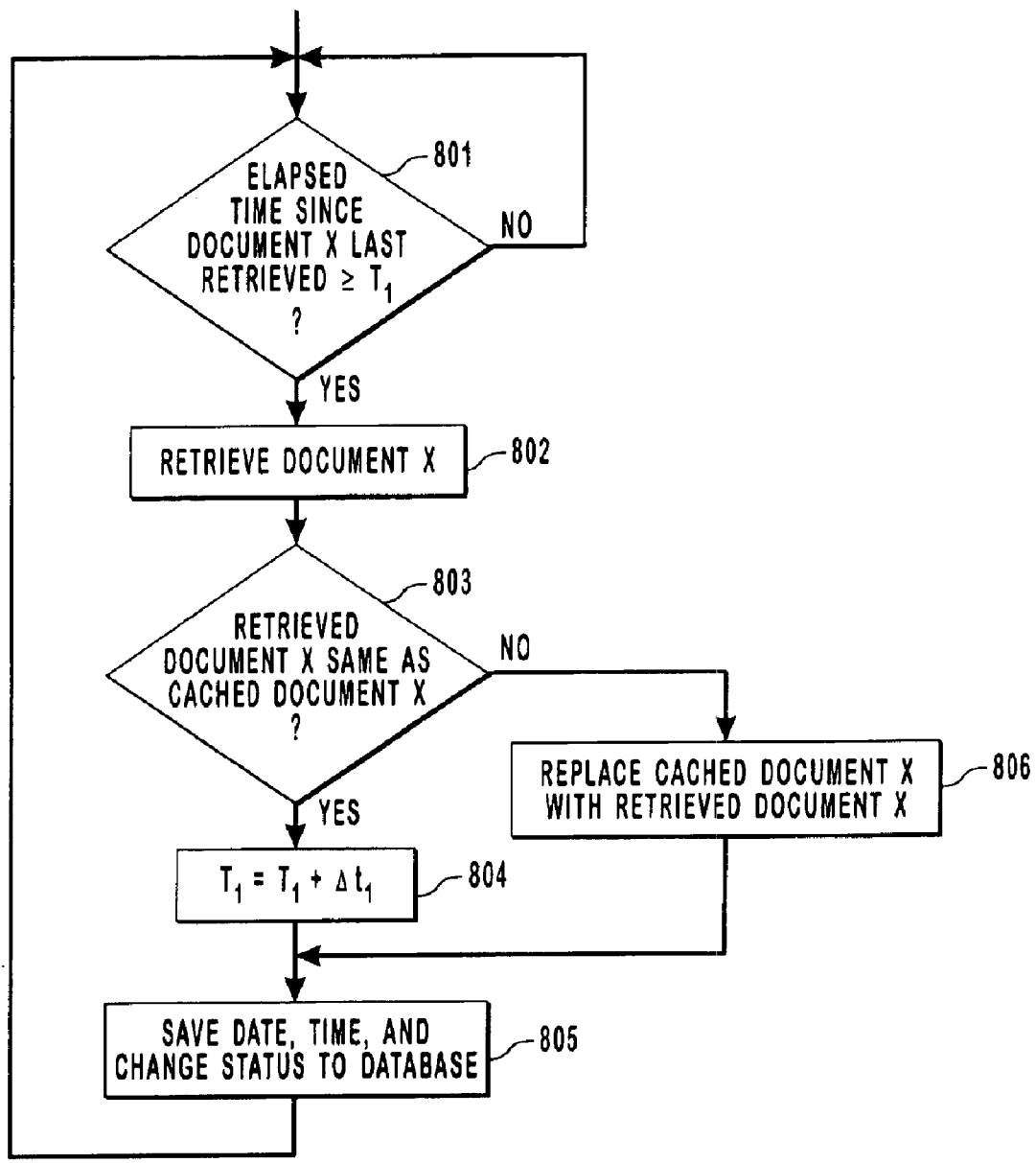
FIG. 8 is a flow diagram illustrating a routine for updating documents stored in the proxy cache using data stored in a persistent database.

FIG. 8 illustrates a routine for updating documents stored in the proxy cache 65 using data stored in the document database 61. Assume a document X has been stored in the proxy cache 65. Document X remains in the cache 65 until a predetermined update period $T_1$ expires (step 801). Upon the expiration of the update period $T_1$, the document X is again retrieved from the appropriate remote server 4 (step 802). The newly-retrieved document X is then compared to the cached version of document X (step 803). If the document has changed, then the cached version of document X is replaced with the newly-retrieved version of document X (step 806). If not, then the update period $T_1$ is increased according to a predetermined time increment $Dt_1$ (step 804). In any case, the date and time and the change status of document X is saved to the document database 61 (step 805).

Document and Image Prefetching

The document database 61 is also used by the server 5 to store prefetching information relating to documents and images. In particular, the database stores, for each document that has been retrieved, a list of images referenced by the document, if any, and their locations. Consequently, the next tune a document is requested by a client 1, the images can be immediately retrieved by the server 5 (from the cache 65, if available, or from the remote server 4), even before the client 1 requests them. This procedure improves the speed with which requested Web pages are downloaded to the client.

The document database 61 is also used to facilitate a process referred to as "server-advised client prefetching." Server-advised client prefetching allows the server 5 to inform the client 1 of documents or images which are popular to allow the client 1 to perform the prefetching. In particular, for any given document, a list is maintained in the server 5 of the most popular hypertext anchors in that document (i.e., those which have previously received a large number of hits). When that document is requested by the client 1, the server 5 provides the client 1 with an indication of these popular links.

3. Redirects

Web pages are sometimes forwarded from the remote server on which they are initially placed to a different location. Under the HTTP (Hypertext Transport Protocol), such forwarding is sometimes referred to as a "redirect." When an HTML document is initially stored on one remote server and then later transferred to another remote server, the first remote server will provide, in response to a request for that document, an indication that the document has been transferred to a new remote server. This indication generally includes a forwarding address ("redirect address"), which is generally a URL.

In the prior art, when a computer requesting a Web page receives a redirect, it must then submit a new request to the redirect address. Having to submit a second request and wait for a second response consumes time and increases overall latency. Consequently, the present invention uses the document database 61 to store any redirect address for each document or image. Any time a redirected document is requested, the server 5 automatically accesses the redirect address to retrieve the document. The document or image is provided to the client 1 based on only a single request from the client 1. The change in location of the redirected document or image remains completely transparent to the client 1.

Figure 9:
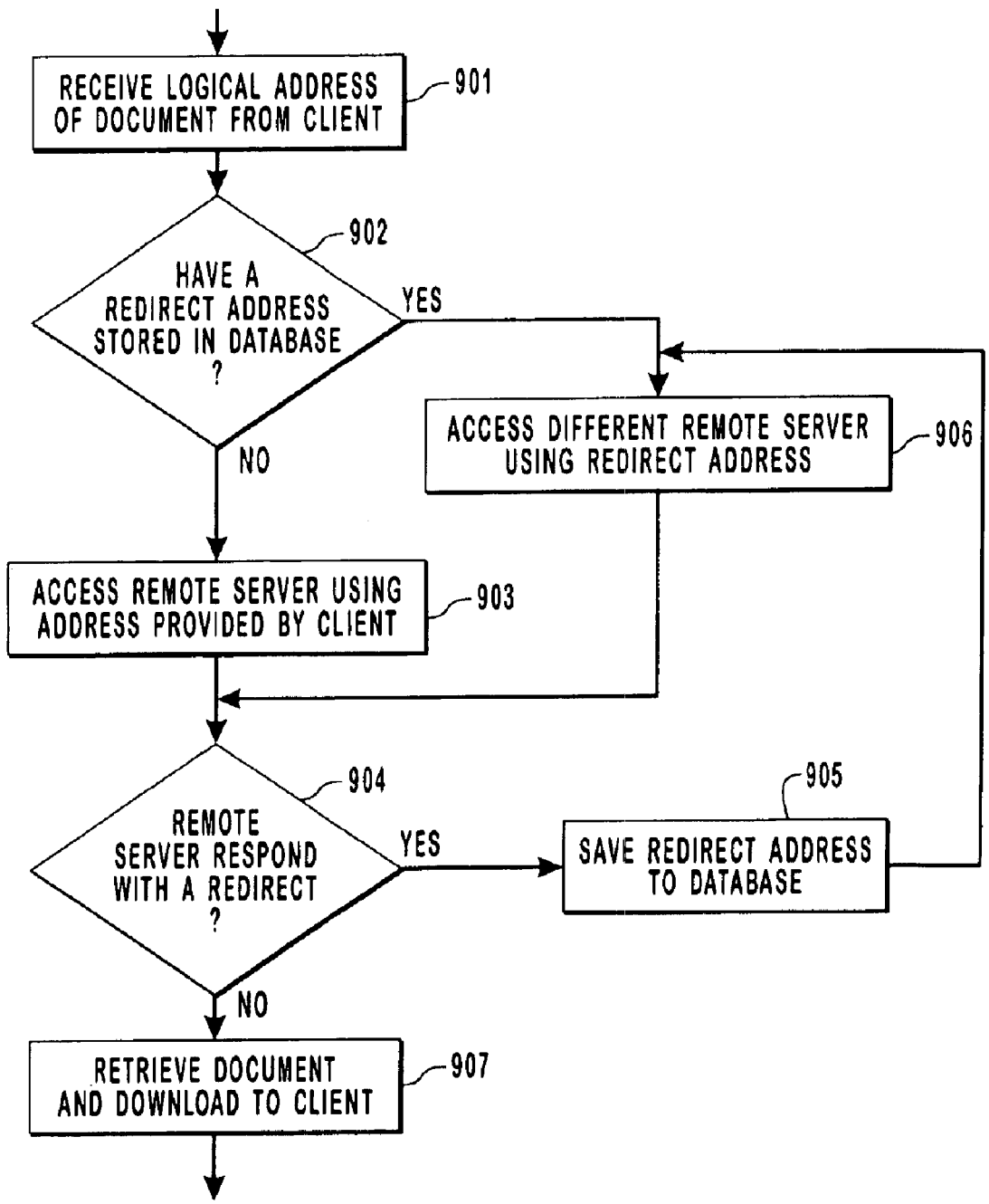
FIG. 9 is a flow diagram illustrating a routine used by a server for retrieving documents from another remote server.

FIG. 9 illustrates a routine performed by the server 5 in accessing documents which may have been forwarded to a new remote server. Initially, the server 5 receives a request for a document, which generally includes an address (step 901). The server 5 then accesses the document database 61 to determine whether there is a redirect address for the requested document (step 902). If there is no redirect address, then the server 5 accesses a remote server 4 based on the address provided in the document request from the client 1 (step 903). Assuming that the remote server 4 does not respond to the server 5 with a redirect (step 904), the document is retrieved and downloaded to the client 1 by the server 5 (step 907). If, however, a redirect address was stored in the document database 61 (step 902), then the server 5 accesses the requested document according to the redirect address (step 906). Or, if the remote server 4 responded with a redirect (step 904), then the server 5 saves the redirect address to the document database 61 (step 905) and accesses the requested document according to the redirect address (step 906).

4. Other Proxy Functions

The document database 61 also stores information relating to the performance of each remote server 4 from which a document is retrieved. This information includes the latency and throughput of the remote server 4. Such information can be valuable in instances where a remote server 4 has a history of responding slowly. For example, when the document is requested, this knowledge can be used by the server 5 to provide a predefined signal to the client 1. The client 1 can, in response to the signal, indicate to the user that a delay is likely and give the user the option of canceling the request.

5. Backoff Mode

Although the server 5 generally operates in the proxy mode, it can also enter a "backoff mode" in which the server 5 does not act as a proxy, or the server 5 performs only certain aspects of the normal proxying functions. For example, if the proxy cache 65 is overloaded, then the server 5 can enter a backoff mode in which documents are not cached but are transcoded as required. Alternatively, during times when the server 5 is severely overloaded with network traffic, the server 5 may instruct the client 1 to bypass the server 5 and contact remote servers 4 directly for a specified time or until further notice. Or, the server 5 can enter a flexible backoff mode in which the client 1 will be instructed to contact a remote server 4 directly only for certain Web sites for a limited period of time.

D. Access to WebTV™ Services

The WebTV™ server 5 provides various services to the client 1, such as proxying and electronic mail ("e-mail"). In the prior art, certain difficulties are associated with allowing a client computer access to different services of an Internet service, as will now be explained with reference to FIG. 10.

Figure 10:
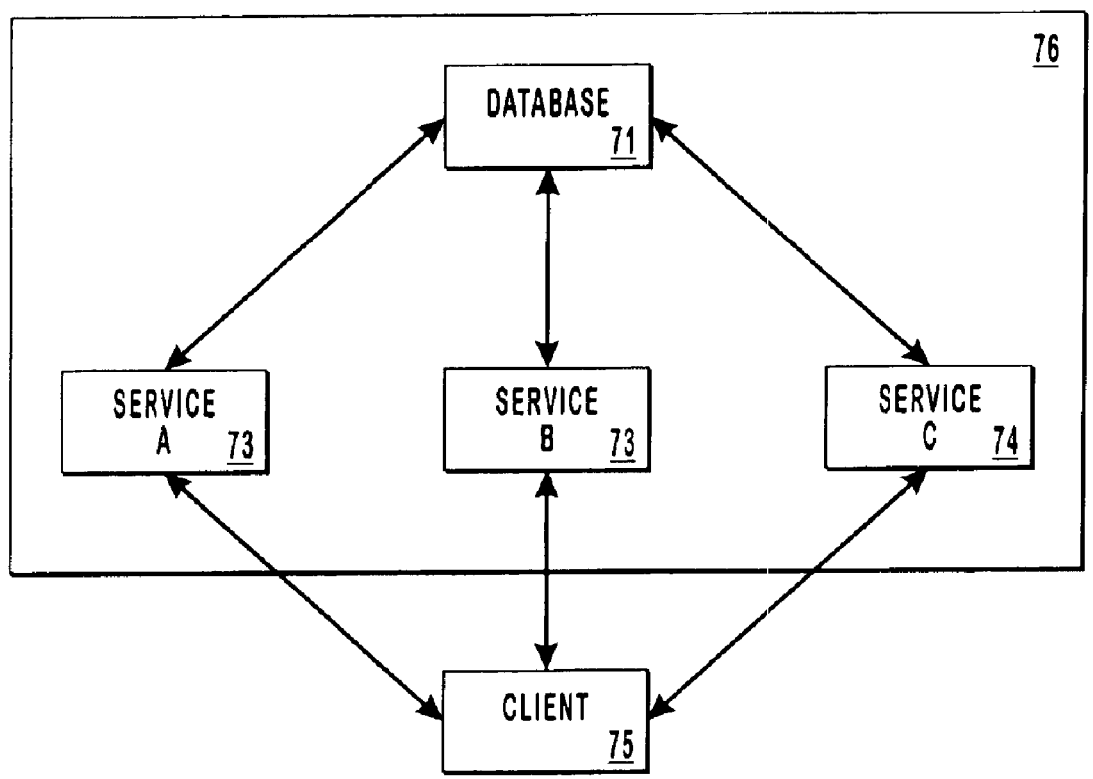
FIG. 10 is a block diagram of a prior art server system showing a relationship between various services and a database.

FIG. 10 illustrates a client-server system according to one prior art embodiment. The server 76 provides various services A, B, and C. The server 76 includes a database 71 for storing information on the user's access privileges to services A, B, and C. The client 75 of the embodiment of FIG. 10 accesses any of services A, B, and C by contacting that service directly. The contacted service then accesses the database 71, which stores the access privileges of the client 75, to determine whether the client 75 should be allowed to access that service. Hence, each service provided by the server 76 requires direct access to the database 71. This architecture results in a large number of accesses being made to the database 71, which is undesirable. In addition, the fact that each service independently has access to the database raises security concerns. Specifically, it can be difficult to isolate sensitive user information. The present invention overcomes such difficulties using a technique which is now described.

1. Tickets Containing Privileges And Capabilities

Figure 11:
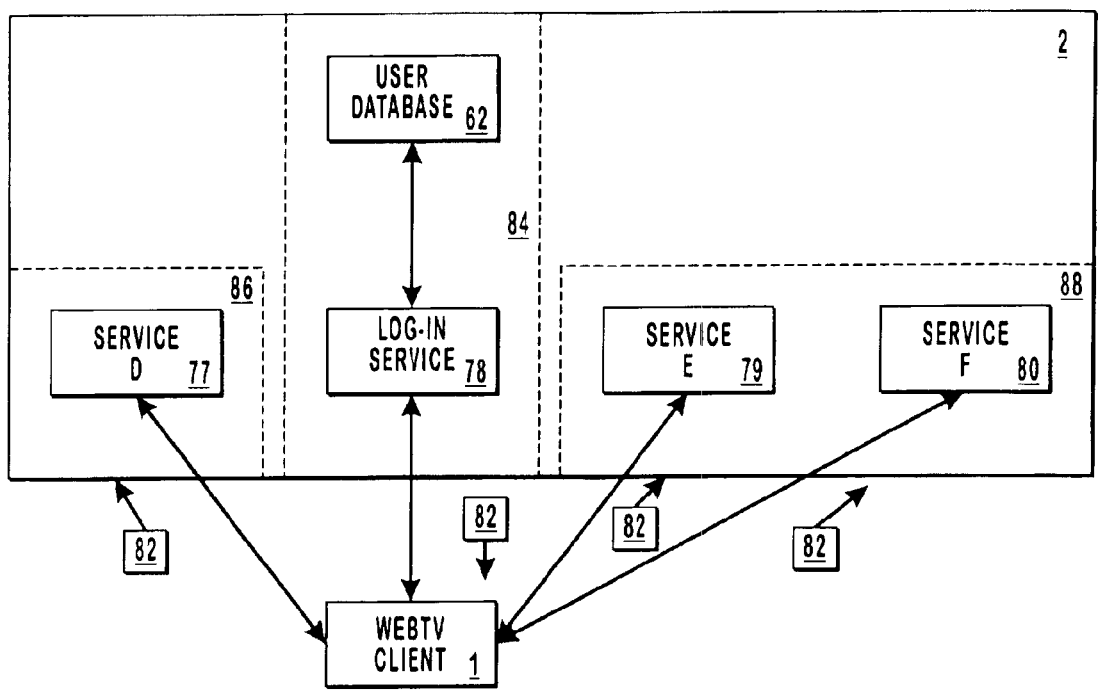
FIG. 11 is a block diagram of a server system according to the present invention showing a relationship between various services and a user database.

As shown in FIG. 11, the server 5 provides a number of services D, E, and F, 77, 78 and 80, respectively, and a log-in service 78. The log-in service is used specifically to control initial log-on procedures by a client 1. The log-in service 78 has exclusive access to the user database 62 (discussed above with respect to FIG. 4B). The log-in service 78 and the user database 62 are located within a first security zone 84. Service D is located within a second security zone 86, while services E and F are contained within a third security zone 88. Note that the specific arrangement of security zones 84, 86, and 88 with respect to services D, E, and F is illustrative only.

The user database 62 of the present invention stores various information pertaining to each authorized user of a client 1. This information includes account information, a list of the WebTV™ services that are available to the particular user, and certain user preferences. For example, a particular user may not wish his client 1 to be used to access Web pages having adult-oriented subject matter. Consequently, the user would request that his account be filtered to prevent access to such material. This request would then be stored as part of the user data in the user database 62.

With regard to user preferences, the hypertext links selected by a given user can be tracked, and those having the largest number can be stored in the user database 62. The list can then be provided to the client 1 for use in generating a menu screen of the user's favorite Web sites, to allow the user to directly access those Web sites. The list can also be used by the server 5 to analyze the user's interests and to formulate and provide to the user a list of new Web sites which the user is likely to be interested in. The list might be composed by associated key words in Web pages selected by the user with other Web pages.

Referring again to FIG. 11, in response to a log-on request by a client 1, the log-in service 78 consults the user database 62 to determine if access to the server 5 by this particular client 1 is authorized. Assuming access is authorized, the log-in service 78 retrieves certain user information pertaining to this particular client 1 from the user database 62. The log-in service then generates a "ticket" 82, which is an information packet including the retrieved information. The ticket 82 is then provided to the client 1 which requested access.

The ticket 82 includes all information necessary to describe the access privileges of a particular user with respect to all services provided by the server 5. For example, the ticket may include the user name registered to the client 1, the e mail address assigned to client 1, and any filtering requested by the user with respect to viewing Web sites. Each time the user requests access to one of the services D, E, or F, the client 1 submits a copy of the ticket 82 to that service. The requested service can then determine from the copy of the ticket 82 whether access to that service by that client 1 is authorized and, if so, any important information relating to such access.

None of the services provided by the server 5, other than the log-in service 78, has access to the user database 62. Hence, any security-sensitive information can be isolated within the user database 62 and the log-in service 78. Such isolation allows the individual services provided by the server 5 to be placed within separate "firewalls" (security regions), illustrated as security zones 84, 86, and 88. In addition, this technique greatly reduces the number of accesses required to the user database 62 compared to the prior art embodiment illustrated in FIG. 10.

2. Redundancy of Services and Load Balancing

The present invention also includes certain redundancies in the various services provided by the server 5. In particular, a given service (e.g., e-mail) can be provided by more than one physical or logical device. Each such device is considered a "provider" of that Service. If a given provider is overloaded, or if the client 1 is unable to contact that provider, the client 1 can contact any of the other providers of that service. When the server 5 receives a log-in request from a client 1, in addition to generating the above-described ticket 82, the log-in service 78 dynamically generates a list of available WebTV™ services and provides this list to the client 1.

The server 5 can update the list of services used by any client 1 to reflect services becoming unavailable or services coming on-line. Also, the list of services provided to each client 1 can be updated by the server 5 based upon changes in the loading of the server 5, in order to optimize traffic on the server 5. In addition, a client's list of services can be updated by services other than the log-in service 78, such that one service can effectively introduce another service to the client 1. For example, the e-mail service may provide a client 1 with the name, port number and IP of its address book service. Thus, one service can effectively, and securely within the same chain of trust, introduce another service to the client 1.

This list of services includes the name of each service, a port number for the provider of each service, and an IP (Internet Protocol) for each service. Different providers of the same service are designated by the same name, but different port numbers and/or IPs. Note that in a standard URL, the protocol is normally specified at the beginning of the URL, such as "HTTP://www. . . . " under the HTTP protocol. However, according to the present invention, the normal protocol designation (i.e., "HTTP") in the URL is replaced with the name of the service, since the port number and IP for each service are known to the client 1. Hence, the client 1 can access any of the redundant providers of a given service using the same URL. This procedure effectively adds a level of indirection to all accesses made to any WebTV™ Service and automatically adds redundancy to the proxy service. It should also be noted that separate service names can also refer to the same service.

Assume, for example, that the e-mail service provided by the WebTV™ system is designated by the service name "WTV-mailto." A client 1 can access any provider of this e-mail service using the same URL. The client 1 merely chooses the appropriate port number and IP number to distinguish between providers. If the client 1 is unable to connect to one e-mail provider, it can simply contact the next one in the list.

Figure 12:
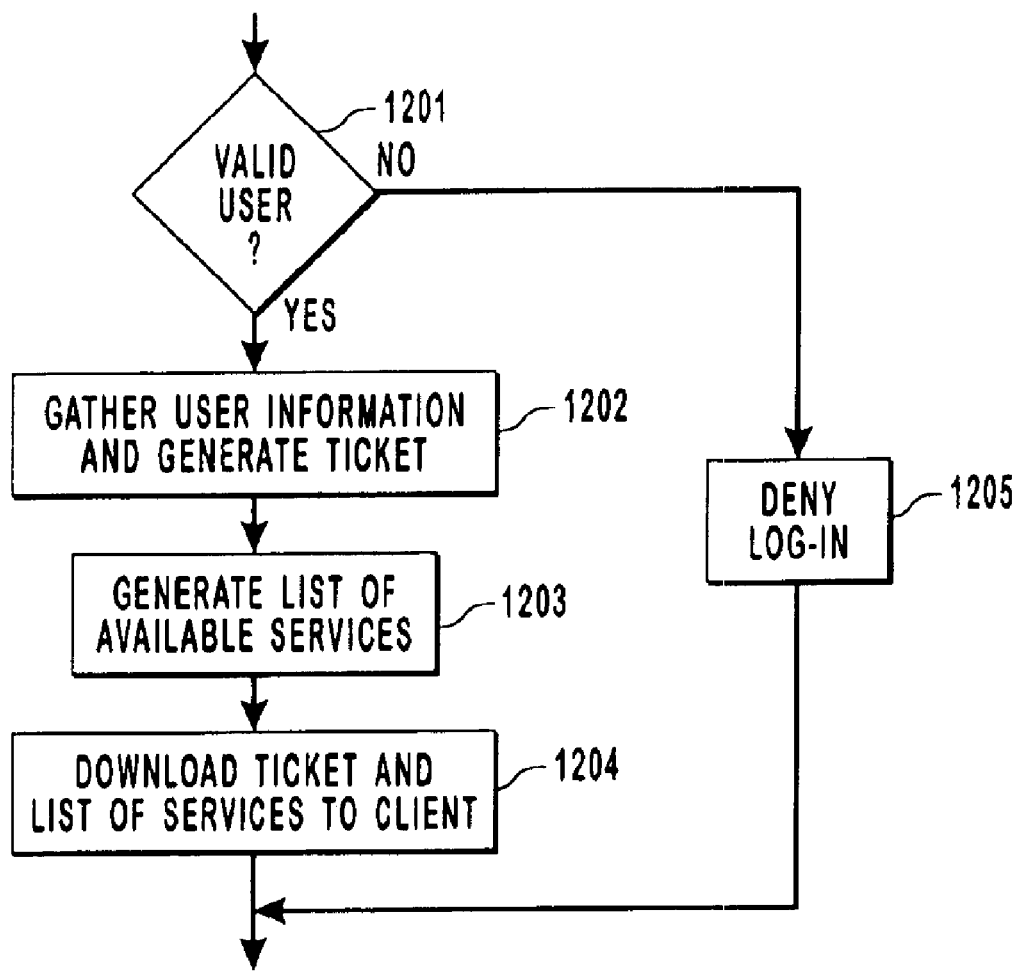
FIG. 12 is a flow diagram illustrating a routine used by a server for regulating access to various services provided by the server.

Thus, at log-in time, a client 1 is provided with both a ticket containing privileges and capabilities as well as a list of service providers, as illustrated in FIG. 12. Initially, the log-in service 78 determines whether the user of client 1 is a valid user (step 1201). If not, log-in is denied (step 1205). If the user is a valid user, then the log-in service 78 gathers user information from the user database 62 and generates a ticket 82 (step 1202). The log-in service 78 also generates the above-described list of services (step 1203). The ticket 82 and the list of services are then downloaded to the client 1 (step 1204).

3. Asynchronous Notification to Clients by Server

Another limitation associated with prior art Internet servers is the inability to provide asynchronous notification information to the client in the absence of a request from the client to do so. It would be desirable, for example, for a server to notify a client on its own initiative when a particular Web page has changed or that a particular service is inaccessible. The server 5 of the present invention provides such capability, and the client 1 is configured to receive and; decode such notifications. For example, the client 1 can receive updates of its listing of service providers from the server 5 at various points in time, as already described.

Similarly, if a particular service provider becomes unavailable, that fact will be automatically communicated to the client 1. As another example, if e-mail addressed to the user has been received by the server 5, then the server 5 will send a message to the client 1 indicating this fact. The client 1 will then notify the user that e-mail is waiting by a message displayed on the television set 12 or by an LED (light emitting diode) built into the housing of WebTV™ box 10.

Thus, a method and apparatus have been described for providing proxying and transcoding of documents in a network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. For a server system comprising a plurality of remote service providers accessible to a plurality of client systems through a network, a computer program product comprising one or more computer readable media carrying computer executable instructions that implement a method of improving access to any of one or more services provided by the plurality of remote service providers, the method comprising steps for:

at a log-in service, determining the validity of a log-in request received from a client system;

at the log-in service determining the validity of the log-in request, generating a list of one or more services that can be accessed by the client system, wherein the list of one or more services comprises one or more available service providers for the list of one or more services so that if an available service provider for a requested service becomes unavailable, the client system can look to any other available service provider that is listed for the requested service;

downloading to the client system the list of one or more services and the one or more available service providers for the list of one or more services so that the client system can use the downloaded list of one or more services in accessing the requested service;

at the requested service, specifying one or more additional services and one or more corresponding service providers, previously unknown to the client, that are available for client access; and downloading, from the requested service, the identified one or more additional services and the one or more corresponding service providers to the client, such that the requested service introduces the one or more additional services to the client without involvement of the log-in service.

2. A computer program product as recited in claim 1, wherein the list of one or more services includes at least one of (i) a service name, (ii) a port identifier, and (iii) a protocol, for each service in the list of one or more services.

3. A computer program product as recited in claim 1, wherein the list is based at least in part on loading conditions at the one or more available service providers.

4. A computer program product as recited in claim 1, the method further comprising a step for updating the downloaded list of one or more services.

5. A computer program product as recited in claim 4, wherein updating the downloaded list of one or more services is based at least in part on at least one of (i) a service or service provider becoming unavailable, and (ii) a new service or service provider coming one line.

6. A computer program product as recited in claim 4, wherein updating the downloaded list of one or more services is based at least in part on loading conditions.

7. A computer program product as recited in claim 1, wherein the list of one or more services comprises at least two service entries, each having a unique name, and wherein the at least two service entries refer to the same service.

8. A computer program product as recited in claim 1, wherein the list of one or more services comprises an email service.

9. For a server system comprising a plurality of remote service providers accessible to a plurality of client systems through a network a computer program product comprising one or more computer readable media carrying computer executable instructions that implement a method of improving access to any of one or more services provided by the plurality of remote service providers, the method comprising acts of:

at a log-in service, receiving a log-in request from a client system;

at the log-in service, creating a list of one or more services that can be accessed by the client system, and for each service in the list of one or more services, identifying one or more available service providers so that if an available service provider for a requested service becomes unavailable, the client system can look to any other available service provider that is listed for the requested service;

sending to the client system, the list of one or more services and the one or more available service providers for each of one or more services in the list so that the client system can use the list of one or more services in accessing the requested service, and thereby balancing workload;

at the requested service, identifying one or more additional services and one or more corresponding service providers, previously unknown to the client, that are available for client access; and from the requested service, sending the identified one or more additional services and the one or more corresponding service providers to the client, such that the requested service introduces the one or more additional services to the client without involvement of the log-in service.

10. A computer program product as recited in claim 9, wherein the list of one or more services comprises at least one of (i) a service name, (ii) a port identifier, and (iii) a protocol, for each service in the list of one or more services.

11. A computer program product as recited in claim 9, wherein the list is based at least in part on loading conditions at the one or more available service providers.

12. A computer program product as recited in claim 9, the method further comprising an act of sending an updated list of one or more services to the client system.

13. A computer program product as recited in claim 12, wherein sending the updated list of one or more services is at least in part due to at least one of (i) a service or service provider becoming unavailable, and (ii) a new service or service provider coming one line.

14. A computer program product as recited in claim 12, wherein sending the updated list of one or more services is due at least in part to loading conditions.

15. A computer program product as recited in claim 9, wherein the list of one or more services comprises at least two service entries, each having a unique name, and wherein the at least two service entries refer to the same service.

16. A computer program product as recited in claim 9, wherein the list of one or more services comprises an email service.

17. For a networked computer system comprising a plurality of service providers that may be accessed by a plurality of client systems through a network, a computer program product comprising one or more computer readable media carrying computer executable instructions that implement a method of balancing workload among the plurality of service providers, the method comprising acts of:

for a particular client system, identifying one or more services that can be accessed by the particular client system;

for each of the one or more services that can be accessed by the particular client system, identifying one or more available service providers based at least in part on loading conditions at the one or more available service providers;

creating a list comprising the one or more services and the one or more available service providers for each of the one or more services;

sending to the particular client system, the list comprising the one or more services and the one or more available service providers for each of one or more services so that the client system can use the list in accessing the one or more services;

at one of the one or more services in the list, identifying one or more additional services not included in the list and one or more corresponding service providers that are available to the particular client system for access; and from the one service, sending the identified one or more additional services not included in the list and the one or more corresponding service providers to the particular client system, such that the one service introduces the one or more additional services not included in the list to the particular client system.

18. A computer program product as recited in claim 17, wherein the list of one or more services comprises at least one of (i) a service name, (ii) a port identifier, and (iii) a protocol, for each service in the list of one or more services.

19. A computer program product as recited in claim 17, the method further comprising an act of sending an updated list of one or more services to the particular client system.

20. A computer program product as recited in claim 19, wherein sending the updated list of one or more services is at least in part due to at least one of (i) a service or service provider becoming unavailable, and (ii) a new service or service provider coming one line.

21. A computer program product as recited in claim 19, wherein sending the updated list of one or more services is due at least in part to dynamic loading conditions.

22. A computer program product as recited in claim 17, wherein the list of one or more services comprises at least two service entries, each having a unique name, and wherein the at least two service entries refer to the same service.

23. A computer program product as recited in claim 17, wherein the list of one or more services comprises an email service.

* * * * *